Figure 1:
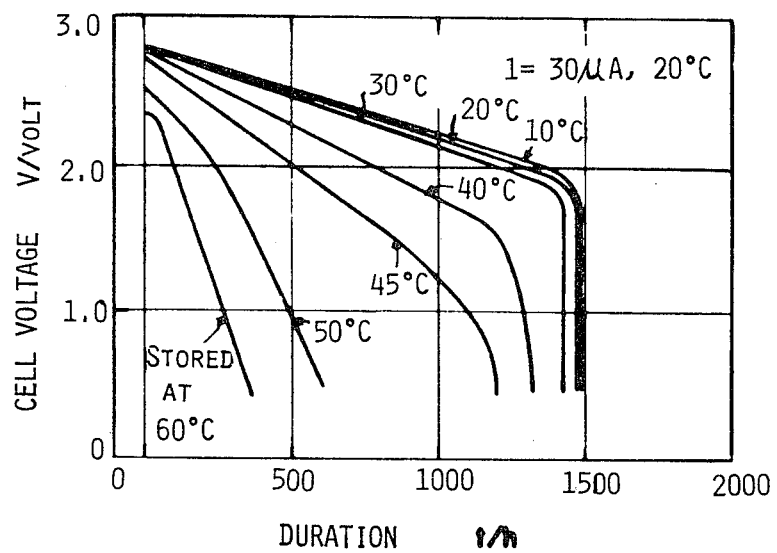

United States Patent

Sotomura et al.

[11] 4,332,865
[45] Jun. 1, 1982

[54] PROCESS FOR PRODUCING SOLID ELECTROLYTE PRIMARY CELL

[75] Inventors: Tadashi Sotomura, Kashiwara; Satoshi Sekido, Yawata; Ken'Ichi Morigaki, Kobe; Ryoji Okazaki, Katano; Muneaki Nakai, Toyonaka, all of Japan

[73] Assignee: Matsushita Electric Industrial Co., Ltd., Osaka, Japan

[21] Appl. No.: 193,156

[22] Filed: Oct. 2, 1980

[30] Foreign Application Priority Data

Oct. 8, 1979 [JP] Japan .................................. 54-134951
Oct. 8, 1979 [JP] Japan .................................. 54-134952

[51] Int. Cl.³ ............................................. H01M 6/18
[52] U.S. Cl. ..................................... 429/48; 429/101; 429/199; 429/213
[58] Field of Search ............... 429/191, 199, 101, 188, 429/213, 48

[56] References Cited

U.S. PATENT DOCUMENTS

| | | | |
|---|---|---|---|
| 3,660,163 | 5/1972 | Moser | 429/191 |
| 3,723,183 | 3/1973 | Greatbatch | 429/191 X |
| 4,049,890 | 9/1977 | Schneider | 429/199 |
| 4,128,703 | 12/1978 | Mead et al. | 429/101 |
| 4,166,887 | 9/1979 | Mueller | 429/191 |

Primary Examiner—Anthony Skapars
Attorney, Agent, or Firm—Joseph W. Farley

[57] ABSTRACT

A process for producing a solid electrolyte primary cell comprising a lithium anode and an iodine containing cathode. In the process the cell undergoes preliminary cell discharge of at least 2 mAh per cm² of the lithium anode surface immediately after its fabrication. Alternatively, the cell may be stored at a relatively low temperature to undergo preliminary self-discharge of at least 3 mAh per cm² of the anode surface.

2 Claims, 2 Drawing Figures

PROCESS FOR PRODUCING SOLID ELECTROLYTE PRIMARY CELL

The present invention relates to a process for producing a solid electrolyte primary cell which comprises lithium as an anode active material and an iodine containing cathode active material, for example, a charge transfer complex of iodine with an aromatic heterocyclic compound, and which has an improved storage performance.

A cell of the type described forms, by contact between the anode and cathode, a lithium ion conductive solid electrolyte layer at the interface between the two electrodes through a self-discharge reaction represented by $2Li + I_2 \rightarrow 2LiI$. The electrolyte layer thus formed serves as a separator for separating the electrodes to provide a high energy cell of about 3 V.

After the fabrication of the cell, the solid electrolyte layer continuously grows through the above mentioned self-discharge reaction due to the diffusion of iodine from the cathode through the layer. With the growth of the layer, the internal resistance of the cell increases proportionally to the square root of the storage period of the cell, reflecting the increasing difficulty of the iodine diffusion through the layer.

This formation of the layer, however, does not necessarily occur uniformly over the entire lithium surface. Particularly when the cell is stored at a high temperature, such as at 45° C. or 60° C. for example, the lithium anode is consumed locally intensively by the reaction with the iodine, consequently forming pits in the lithium surface. Such a phenomenon is often observed in metallic corrosion and is called pitting corrosion.

The intensively corroded portions of the lithium anode are substantially inactive to cell discharge reaction due to too thick an electrolyte layer formed thereon and the effective area of the lithium anode is thereby reduced. When the cell thus stored is subjected to the cell discharge, the slope of the discharge curve of the cell becomes sharp in comparison with that obtained immediately after the fabrication of the cell, reflecting reduction in the effective area of the lithium anode.

The main object of the present invention is to provide a process for producing a solid electrolyte primary cell which is less subject to deterioration in the cell discharge performance involved in the storage of the cell, particularly in the storage at a high temperature.

The cell to which the process of the invention is applied comprises lithium as an anode active material and an iodine containing cathode active material, for example, a charge transfer complex of iodine with an aromatic heterocyclic compound. The cell is fabricated by bringing the anode material into direct contact with the cathode material. By this contact, a solid electrolyte layer having LiI as its main constituent and serving as a separator is formed at the interface between the two electrodes through the reaction represented by $2Li + I_2 \rightarrow 2LiI$. According to the process of the invention, the cell, immediately after the fabrication, is subjected to preliminary cell discharge until the amount of the discharge reaches at least 2 mAh per cm$^2$ of the lithium anode surface, or alternatively it is subjected to self-discharge at a temperature of not more than 30° C. until the amount of the self-discharge reaches at least 3 mAh per cm$^2$ of the lithium anode surface. By such treatment, the solid electrolyte layer is formed uniformly and densely over the entire interface and the deterioration in the cell discharge performance entailed in the storage of the cell, especially in the storage at a high temperature (e.g. 60° C.) is greatly mitigated.

Figure 2:
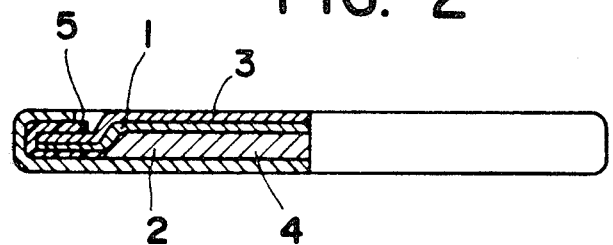

Features and advantages of this invention will become apparent from the following detailed description of the accompanying drawings, in which;

FIG. 1 is a graph showing the discharge characteristics of solid electrolyte cells after being stored at various temperatures, FIG. 2 is a side elevation partly in section showing the principal portion of solid electrolyte cell.

Referring to FIG. 1, it shows the discharge curves of solid electrolyte primary cells of the configuration shown in FIG. 2 as discharged at a steady current of 30 μA at 20° C. after being stored for 30 days at varying temperatures of 10°, 20°, 30°, 40°, 45°, 50° and 60° C. respectively. It is to be noted from the graph that the discharge characteristic of a cell drastically deteriorates if the cell is discharged after having been stored at a temperature of 40° to 45° C. or more. The following table gives the inclination of each cell during a discharge period of from 20 to 400 hours.

TABLE 1

| Storage Temperature (°C.) | 10 | 20 | 30 | 40 | 45 | 50 | 60 |
|---|---|---|---|---|---|---|---|
| Inclination (mV/hr) | 0.62 | 0.61 | 0.63 | 0.78 | 1.8 | 3.8 | 6.7 |

We have carried out an experiment in which cells were first subjected to various preliminary cell discharges and thereafter the cells were stored for a certain period at a high temperature. The cells thus obtained were discharged to test for their discharge characteristics. As the result of the experiment, we have found that if a cell is subjected to preliminary cell discharge after its fabrication until the amount of discharge reaches at least 2 mAh per cm$^2$ of the lithium anode surface, the cell will see reduced deterioration in its discharge characteristic (sharp inclination of discharge curve) even after it is stored at a high temperature, such as at 45° C. or 60° C.

We have also executed another experiment in which cells were preliminarily stored at various temperatures for varying periods. As the result we have found that a cell stored preliminarily at a temperature of not more that 30° C. to undergo self-discharge corresponding to 3 mAh or more per cm$^2$ of the lithium anode will see reduced deterioration in its discharge performance even after its subsequent storage at a high temperature.

The present invention is conceived on the basis of the above experiments and some examples thereof are hereinbelow described.

FIG. 2 shows a solid electrolyte primary cell of coin type used in the examples and having an outside diameter of 22.4 mm and a thickness of 1.0 mm. Indicated at 1 is a metal lithium anode having a thickness of 0.2 mm and an area of 2.54 cm$^2$. A cathode composition 2 having iodine as its main constituent is prepared by mixing, on a weight basis, 5 parts of 1-n-bytylpyridinium polyiodide charge transfer complex comprising 15 iodine atoms per nitrogen atom with 1 part of silica gel useful for chromatography. Indicated at 3 is a top seal plate serving also as an anode current collector, at 4 a cell can serving also as a cathode current collector and at 5 a packing.

EXAMPLE 1

Immediately after fabrication, cells were subjected to preliminary cell discharge at 20° C. at 10 μA for predetermined periods and thereafter stored at 60° C. for 30 days. The cells thus obtained were discharged at 20° C. at a steady current of 30 μA to test for their discharge performance.

TABLE 2

| Preliminary discharge current (μA) | 10 | | | | | |
|---|---|---|---|---|---|---|
| Preliminary discharge period (hr) | 48 | 336 | 480 | 600 | 840 | 1080 |
| Amount of preliminary discharge (mAh/cm$^2$) | 0.19 | 1.32 | 1.88 | 2.36 | 3.31 | 4.25 |
| *Inclination of discharge curve at 20° C. at 30 μA (mV/hr) | 6.1 | 5.3 | 3.8 | 0.72 | 0.77 | 0.86 |

*The inclination was taken during the discharge period of from 20 to 400 hours after the cells were stored at 60° C. for 30 days.

EXAMPLE 2

Immediately after fabrication, cells were subjected to preliminary discharge at 30° C. at 30 μA for specified periods and thereafter stored at 60° C. for 30 days. The cells thus obtained were discharged at 20° C. at a steady current of 30 μA.

TABLE 3

| Preliminary discharge current (μA) | 30 | | | | | |
|---|---|---|---|---|---|---|
| Preliminary discharge period (hr) | 48 | 120 | 170 | 264 | 288 | 312 |
| Amount of Preliminary discharge (mAh/cm$^2$) | 0.57 | 1.42 | 2.01 | 3.12 | 2.40 | 3.69 |
| *Inclination of discharge curve at 20° C. at 30 μA (mV/hr) | 5.4 | 3.8 | 0.92 | 1.0 | 0.86 | 0.88 |

*The inclination was taken during the discharge period of from 20 to 400 hours after the cells were stored at 60° C. for 30 days.

EXAMPLE 3

Immediately after fabrication, cells were subjected to preliminary discharge at 10° C. at 5 μA for predetermined periods and thereafter stored at 60° C. for 30 days. The cells thus obtained were discharged at 20° C. at a constant current of 30 μA.

TABLE 4

| Preliminary discharge current (μA) | 5 | | | | | |
|---|---|---|---|---|---|---|
| Preliminary discharge period (hr) | 720 | 960 | 1080 | 1560 | 1680 | 1920 |
| Amount of Preliminary discharge (mAh/cm$^2$) | 1.42 | 1.89 | 2.13 | 3.07 | 3.31 | 3.78 |
| *Inclination of discharge curve at 20° C. at 30 μA (mV/hr) | 3.9 | 2.9 | 0.84 | 0.67 | 0.62 | 0.64 |

*The inclination was taken during the discharge period of from 20 to 400 hours after the cells were stored at 60° C. for 30 days.

As is apparent from the foregoing examples, if cells are subjected to preliminary discharge immediately after fabrication until the amount of the discharge reaches or exceeds 2 mAh per cm$^2$ of the lithium anode, deterioration in their discharge characteristics due to the subsequent storage at a high temperature will be effectively prevented.

We think the above effects of the invention to be attributable to the following reason. During the preliminary discharge, there is formed at the interface between the lithium anode and the cathode a uniform and dense solid electrolyte layer. After the thickness of the layer reaches a value corresponding to a preliminary discharge amount of 2 mAh/cm$^2$, the diffusion of iodine through the layer becomes uniform and slow over the entire surface of the lithium anode even during high temperature storage of the cell.

EXAMPLE 4

Immediately after fabrication, cells were preliminarily stored at 10° C. for predetermined periods and thereafter stored at 60° C. for 30 days. The cells thus obtained were discharged at 20° C. at a constant current of 30 μA to test for their discharge characteristics.

TABLE 5

| Preliminary storage temperature (°C.) | 10 | | | | | |
|---|---|---|---|---|---|---|
| Preliminary storage period (day) | 5 | 30 | 60 | 120 | 240 | 550 |
| Amount of Preliminary self-discharge (mAh/cm$^2$) | 1.7 | 2.8 | 3.2 | 4.2 | 4.4 | 4.7 |
| *Inclination of discharge curve at 20° C. at 30 μA (mV/hr) | 5.6 | 4.9 | 0.92 | 0.73 | 0.81 | 0.68 |

*The inclination was taken during the discharge period of from 20 to 400 hours after the cells were stored at 60° C. for 30 days.

The amount of the preliminary self-discharge is determined in the following manner. The amount of the remaining iodine in the cathode composition was first determined by redox-titrating it with sodium thiosulfate. Subtract the obtained amount from the initial amount of iodine in the cathode composition to give the quantity of consumed iodine, which quantity is then used to provide the amount of the preliminary self-discharge through necessary calculations.

EXAMPLE 5

The same tests as the Example 4 were executed except that cells were preliminarily stored at 20° C. immediately after fabrication.

TABLE 6

| Preliminary storage temperature (°C.) | 20 | | | | |
|---|---|---|---|---|---|
| Preliminary storage period (day) | 5 | 10 | 20 | 35 | 150 |
| Amount of Preliminary self-discharge (mAh/cm$^2$) | 1.9 | 2.6 | 3.0 | 4.0 | 6.1 |
| *Inclination of discharge curve at 20° C. at 30 μA (mV/hr) | 6.2 | 3.4 | 0.82 | 0.58 | 0.74 |

*The inclination was taken during the discharge period of from 20 to 400 hours after the cells were stored at 60° C. for 30 days.

EXAMPLE 6

The same tests as the Example 4 were executed executed except that cells were preliminarily stored at 30° C.

TABLE 7

| Preliminary storage temperature (°C.) | 30 | | | | | |
|---|---|---|---|---|---|---|
| Preliminary storage period (day) | 5 | 10 | 20 | 35 | 60 | 94 |
| Amount of Preliminary self-discharge (mAh/cm$^2$) | 1.9 | 2.9 | 3.5 | 5.7 | 6.2 | 6.8 |
| Inclination of discharge curve at 20° C. at 30 μA (mV/hr) | 5.8 | 4.3 | 1.0 | 0.81 | 1.2 | 1.1 |

*The inclination was taken during the discharge period of from 20 to 400 hours after the cells were stored at 60° C. for 30 days.

As can be seen from the last three Examples, cells, when stored preliminarily at a temperature of not more than 30° C. until the amount of self-discharge reaches at least 3 mAh/cm$^2$, will see reduced deterioration in their discharge characteristics even after the subsequent storage of the cells.

We think the foregoing effect of the invention to be attributable to the following reason. During preliminary storage at a relatively low temperature (not more than 30° C.), i.e., during prliminary self-discharge reaction, iodine from the cathode consumes the lithium anode uniformly over the entire anode surface, consequently forming at the interface a uniform and dense solid electrolyte layer. After the thickness of the layer reaches a value corresponding to a preliminary self-discharge amount of 3 mAh/cm$^2$, the diffusion of iodine through the layer becomes uniform and slow over the entire surface of the lithium anode even in the event of subsequent high temperature storage of the cell.

It is to be noted that when a cell is preliminarily stored at 40° C. until the amount of self-discharge exceeds 3 mAh/cm$^2$, the slope of discharge curve after storage at 60° C. for 30 days does not become gentle but becomes steep.

The present invention, as above, can be embodied in two different ways, that is, by subjecting the cell to preliminary cell discharge or to preliminary self-discharge. In order to avoid misunderstanding of the following claims, it is to be noted that the term "discharge" is therein used to include "cell discharge" and "self-discharge".

What we claim is:

1. A process for reducing deterioration in the discharge performance due to storage and particularly to high temperature storage of a solid electrolyte primary cell having a lithium anode and an iodine containing cathode, comprising subjecting the cell to preliminary discharge immediately after the fabrication of the cell to form a uniform and dense solid electrolyte layer at the interface between the anode and the cathode, the step of subjecting the cell to preliminary discharge being carried out by subjecting the cell to cell discharge until the amount of such discharge reaches at least 2 mAh per cm$^2$ of the lithium anode surface.

2. A process for reducing deterioration in the discharge performance due to storage and particularly to high temperature storage of a solid electrolyte primary cell having a lithium anode and an iodine containing cathode, comprising subjecting the cell to preliminary discharge immediately after the fabrication of the cell to form a uniform and dense solid electrolyte layer at the interface between the anode and the cathode, the step of subjecting the cell to preliminary discharge being carried out by storing the cell at a temperature not exceeding 30° C. to undergo self-discharge until the amount of such discharge reaches at least 3 mAh per cm$^2$ of the lithium anode surface.

* * * * *